Nov. 25, 1952     R. L. BRIGGS, JR     2,619,624

METHOD FOR RECONDITIONING AND CHANGING BATTERIES

Filed Dec. 27, 1949     3 Sheets-Sheet 1

*Fig. 1.*

ROBERT L. BRIGGS, JR.,
INVENTOR.

HUEBNER, BEEHLER, WORREL,
HERZIG & CALDWELL,
                     ATTORNEYS.
BY

Nov. 25, 1952 R. L. BRIGGS, JR 2,619,624
METHOD FOR RECONDITIONING AND CHANGING BATTERIES
Filed Dec. 27, 1949 3 Sheets-Sheet 3

ROBERT L. BRIGGS, JR.,
INVENTOR.
HUEBNER, BEEHLER, WORREL,
HERZIG & CALDWELL,
BY ATTORNEYS.

Patented Nov. 25, 1952

2,619,624

UNITED STATES PATENT OFFICE 2,619,624

METHOD FOR RECONDITIONING AND CHARGING BATTERIES

Robert L. Briggs, Jr., San Gabriel, Calif., assignor to H and H Products Mfg. Co., Los Angeles, Calif., a partnership Application December 27, 1949, Serial No. 135,162

2 Claims. (Cl. 320—14)

My invention relates to storage batteries composed of a group of secondary cells and has particular reference to a new and improved means and method for reconditioning and recharging such batteries.

Storage batteries of the secondary type are composed of electro-chemical cells which are reversible in their chemical action, i. e., after a cell has been electrically discharged, the chemical action can be reversed by recharging with a proper value direct current. This theoretically restores the cell or battery to its original condition for further use.

The Arrhenius theory of the disassociation of the elements in an electrolyte has been accepted by authorities as a logical hypothesis of the chemical changes taking place in the lead-acid storage battery. In this presentation the author subscribes to the basis of this theory of the electrolytic disassociation or ionization of the elements in solution.

The elements to be found in a lead-acid storage battery are derived from the acid electrolyte and the materials in the form of inorganic compounds from which the positive and negative plates of each cell are constructed.

I refer to the Arrhenius theory of disassociation by the more popular term of ionization. Ionization is a balanced phenomenon, i. e., in that at all times the degree of ionization during either charge or discharge cycle of the lead-acid storage battery there will be found to be equal proportions, positively and negatively charged ions. These are otherwise termed cations and anions respectively. It is the property of ions to carry charges of electricity called electrons. These charges are given up to the anode and cathode of the battery cell as the ions find new union with other elements or radicals in the electrolyte. They unite with ions of opposite polarity to form the end product of either charge or discharge. The electrons carried by these ions are stored in or given up by the battery plates whenever an external circuit has been completed during the charge or discharge cycles. In theory, the degree of ionization is in direct proportion to determined constants of same, for each and every element. Due to inequalities caused by a deficiency of one or more ions in the electrolyte certain compounds are prone to form; in certain instances these are of an insoluble type or have exceedingly high electrical resistance. The formation of these insoluble and highly resistant compounds brings an end to the reversible reaction in part, impairing the capacity and efficiency of the cell. The ability of a battery to receive, retain and deliver a charge of electricity is due to the extremes which it can be charged and discharged, i. e., the further the reaction will proceed to completion in either direction of charged or discharged condition is the direct measure of efficiency. This is only possible with the proper degree of ionization. If the process at end of discharge cycle has proceeded to an extreme and the ionic balance of the electrolyte has been disturbed, the degree of reversibility will be impaired due to formation of insolubles with the attendant loss of molecules of action elements.

The effect of such inequalities of ionization has been termed by the trade as "excess sulphation," "treeing," "internal short circuiting," "plate buckling and warpage," "dead cells," "shorted cells," "worn out battery," and "eroded plates." The cause has been generally classified as due to "overcharge," "undercharge," "excessive heating," "excess sulphation," or a variety of other operational ills and defects.

I believe the true cause to be due to the result of ionic unbalance during process of charge and discharge.

The Helmholtz theory revealed that when any metal or any other substance capable of existing in solution as an ion is immersed in an electrolyte, part of that metal or substance is immediately ionized. As the ion is formed it leaves in the remainder of the material an equivalent electrical charge. Liberated ions, in the form of cations and anions will be attracted to and cling to the plates of opposite polarity. It is accepted by scientific theorists that all ions carrying electronic charges have specific velocities in the electrolyte as they traverse a path between anode and cathode they collide with each other with atomic impact. Dependent entirely of the degree of ionization they may or may not give up their charges and unite with either anion or cation, depending upon specific charge, to form the un-ionized compounds normally the end products of either charge or discharge cycle.

Hydrogen cations and oxygen anions in the ionized condition are high velocity, highly active carriers of electronic charge. They originate as either components of the disassociated battery water ($H_2O$) or are obtained by the disassociated acid ($H_2SO_4$) and lead oxide ($PbO_2$).

The cathode and anode attract ions of opposite polarity among which are the hydrogen and oxygen ion. These, in large part, give up their charges and assume the status of un-ionized gas molecules. They deposit in a multi-molecule deep film over the plate surfaces actually creating an insulating effect, and increasing the battery internal resistance. Likewise this film of gas molecules prevents the electrolyte from contacting active elements of the plates, reducing the rate of electrical energy transfer. Due to the presence of heat during discharge and charge of the battery, a great number of these un-ionized gas molecules escape into the atmosphere where they are irrevocably lost. With this loss of potential ions, particularly the oxygen anions, the ionic balance is disturbed. Lead cations, eager to unite with oxygen anions are forced, by the scarcity of the latter, to combine in a lower valence form, to compound as lead monoxide (PbO). This is the start, with successive charges and recharges, and increased heat formation due to higher internal resistance, to set the stage for the formation of the more complex salts of lead sulphate that have a low disassociation constant, that are highly insoluble and possess high electrical resistance. The loss of active material into these forms is the basic cause of battery failure. Both scope of potential activity and battery efficiency are destroyed by this phenomenon. Each cycle of charge and discharge becomes shorter and weaker. Finally the cells will not come up to a useful potential. Examination of such batteries shows a serious debilitation of active materials and the presence of a great deal of obdurate lead sulphate which is the usual form of complex sulphate form heretofore described.

The conventionally accepted formula of charge and discharge are as follows:

*Discharge cycle*

1.
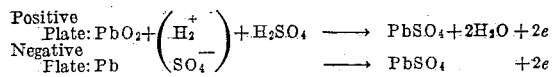

*Charge cycle*

2.
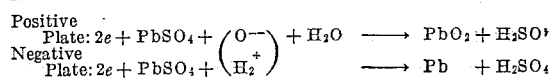

This has been combined into the academic formula as follows:

3.
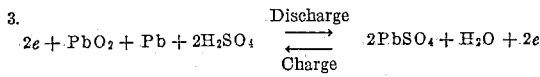

I contend that the following chemical changes will occur during normal operation of the lead-acid storage battery.

*Discharge cycle*

4.
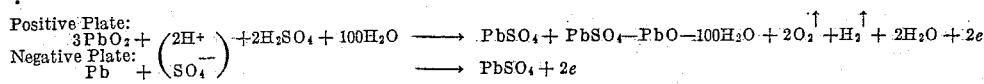

*Charge cycle*

5.
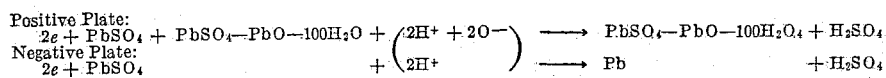

It is apparent that the creation of a highly insoluble compound such as obdurate lead sulphate ($PbSO_4$—$PbO$—$100H_2O$) robs the electrolyte of large quantities of water which combines as water of crystallization to form the massive bulky crystal characteristic of this compound while the escape of hydrogen and oxygen gas molecules seriously depletes the electrolyte and active elements of the battery. The most serious loss in the reduction of active material in the positive plate. The lead oxide ($PbO_2$) is reduced and enters into chemical combustion with the end product obdurate lead sulphate as lead monoxide (PbO). The charge loss of the lead ion normally combined with oxygen ($Pb^{++++}$) and now appearing as the low valence cation ($Pb^{++}$) is apparently the cause of the low disassociation constant of obdurate lead sulphate. The only practical way of reducing the quantities of this material that are formed in a lead-acid storage battery is by my process of re-ionization.

My process of re-ionization is one that employs a reverse current flow during the charging cycle that accomplishes the following:

1. Application of a reverse current of suitable voltage and current characteristics during the charging cycle scatters un-ionized molecules that are clinging to the positive and negative plates. These molecules have no choice but to re-ionize and enter into the useful function they had previously enjoyed.

2. Selection of the time and duration of this reverse current to suit battery and its conditions encountered.

3. Application of the reverse current in a manner that allows the battery itself to regulate the rate of discharge so as to insure maximum safety to itself.

My process of re-ionization is accomplished in the following manner:

1. Charging with a separately excited generator of the shunt series field type, the charge is applied until the normal cell voltage of a Daniel type cell shows indication of charge; polarity of charging generator is suddenly reversed with plus to negative and negative to plus connection made. Direction of this reverse current is selected to suit the type and condition of the battery encountered. Conventional charging connection is then suddenly resumed. The sudden reversal and reconnection is important. As many reversals as necessary may be made dependent upon battery condition and time of duration may be varied until rate of charging shows increase and cell shows diminished resistance.

2. Charging with a self excited generator of the shunt series field type, the charge is applied until cells show evidence of high internal resistance. Polarity of charge of generator is suddenly reversed but field polarity is maintained as it was in original connection. This is accomplished by a special reversing switch described herein.

It is among the objects of my invention to provide a means and method to prevent the formation and/or to cause removal of obdurate lead sulphate by periodic treatments of the battery to maintain ionic balance and to reduce insolubles on plates or in sump whereby maximum battery life will result.

Other and further objects and advantages will become apparent from the drawings and the specifications relative thereto.

In the drawings—

Figure 1 is a schematic view of an electrical circuit embodying the principles of my invention;

Figure 2:
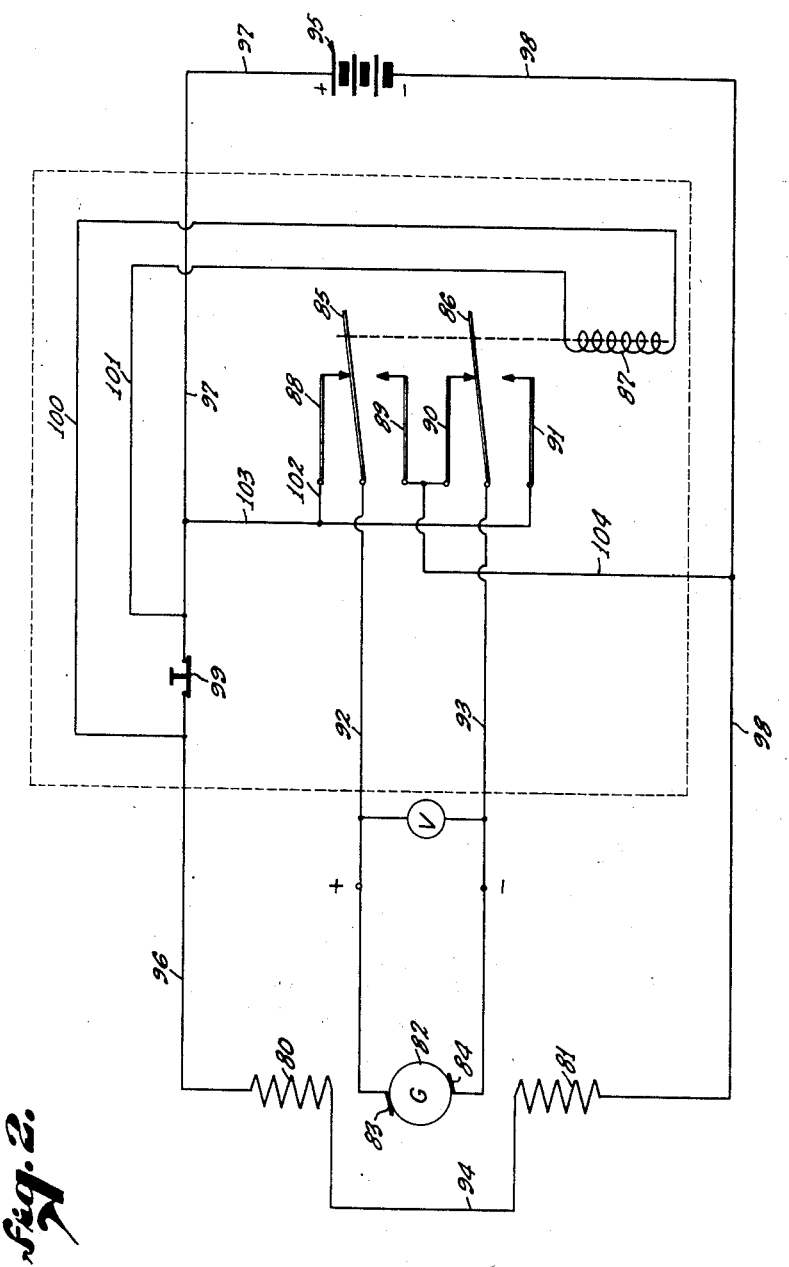
Figure 2 is a schematic diagram of an electrical circuit showing a modified form of my invention.

My invention contemplates the use of a standard motor-generator set having a shunt-wound generator or separately excited generator for generating direct current of the proper voltage for recharging a storage battery. In Figure 1, I have illustrated an electric motor 10 connected with a source of power by conductors 11 and 12, and having a main control switch 13 in series therewith.

A six-volt D. C. full-wave rectifier designated generally by the numeral 15 is connected to the source of power by conductors 16 and 17 and has output circuit including conductors 18 and 19.

A generator having field coils 21 and 22, an armature 23 and brushes 24 and 25 is physically coupled with the motor 10 for rotation thereby.

The field coils 21 and 22 are connected in series by conductor 26 and are connected to the center terminals of a double-poled, double-throw switch, designated generally 27, by means of conductors 28 and 29. The field coils 21 and 22 can therefore be electrically connected to the six-volt rectifier 15 for excitation thereof. Upon reversing the switch 27, the field coils 21 and 22 become connected to the brushes 24 and 25 by means of conductors 31 and 32 so that the generator thus becomes a self-exciting shunt-wound generator.

The generator is connected to the battery to be recharged through a relay by means of circuits to be explained subsequently. The relay is provided with an armature having movable contact points 40 to 43 inclusive. The movable contact points are normally in closed relation with the stationary contacts 44, 45, 46 and 48.

The armature carrying contact points 40 to 43, inclusive, is movable in response to the energization of a magnetic coil 50, the magnetic coil 50 being connected to the source of power through an extension of the conductors 11 and 12 and in series with a normally open switch 51. Energization of the coil 50 by means of closing the contact 51 causes the movable contact points 40 and 41 to disengage from the contacts 44 and 45 and the movable contacts 42 and 43 to close the contact with contact points 47 and 49.

The generator brush 25 is connected with contact points 41 and 42 by conductors 55 and 56 and the brush 24 is connected to movable contact 43 by conductor 57. Stationary contacts 45 and 46 are connected to an ammeter by conductors 58 and 59 through a switch 60. A storage battery 20 to be charged has one terminal connected to the ammeter by conductor 61 and has its other terminal connected to stationary contacts 47 and 48 by conductors 62 and 63.

Thus it will be seen that a completed circuit for charging the battery 20 is created from brush 25 to conductor 55, contact points 41, 45, conductors 58, 59, switch 60, ammeter, conductor 61, storage battery, conductor 62, 63, and contact points 48 and 43, and conductor 57 to the brush 24.

A volt meter is connected in shunt by conductors 68 and 69, contact points 40 and 44, and conductor 70.

Upon closing the contact 51, the coil 50 becomes energized and the armature is displaced, thereby breaking the contact between 40 and 44, 42 and 46, and 43 and 48, and creating contacts between 42 and 47, and 43 and 49. The contact 49 is connected to the conductor 61 by means of conductor 72.

The following circuit is thereby completed: Generator brush 25, conductors 55 and 56, contact points 42 and 47, conductors 63 and 62 to the negative terminal, conductors 61 and 72, contact points 49 and 43, and conductor 57 to brush 24.

It, therefore, becomes apparent that during the reconditioning operation the battery is allowed to charge with the circuit flowing in one direction through the battery, and the operator can, by depressing the proper button and making contact on the switch 51, reverse the flow of current through the battery momentarily for any given desired period of time. As will become apparent later, this reversal of current is highly important.

*Modified circuit*

In Figure 2, I have shown a modified circuit embodying the principles of my invention whereby I use the residual current in the battery for exciting the field coils of the generator. I provide a generator having field coils 80 and 81, armature 82 and brushes 83 and 84. This modification also uses a reversing relay having an armature with movable contact points 85 and 86 movable in response to the energization of a magnetic coil 87, and also has stationary contact points 88 to 91 inclusive. The brushes 83 and 84 of the generator are connected to the movable contact points 85 and 86, respectively, by conductors 92 and 93.

The field coils 80 and 81 are connected in series by means of conductor 94 and are connected in series with a battery 95 by means of conductors 96, 97 and 98. A normally closed switch 99 is interposed between the conductors 96 and 97.

The magnetic coil 87 is connected in shunt across the terminals of the switch 99 by conductors 100 and 101.

The stationary contact points 88 and 91 are connected with the conductor 97 by conductors 102 and 103, and the stationary contacts 89 and 90 are connected to the conductor 98 by conductor 104.

It will be understood that any suitable means is employed for causing rotation of the armature 82 such as a standard electric motor adapted to be connected to a source of power such as is furnished in most modern buildings.

Upon commencing rotation of the armature 82, the field coils 80 and 81 are connected with the battery 95 which serve to energize the field coils 80 and 81. It will be noted that the field coils 80 and 81 are also connected to the brushes 83 and 84 through the contacts 88 and 85 and 90 and 86.

Upon opening the switch 99 sufficient current flows through the coil 87 to cause the movement of the armature downwardly, thereby connecting the contacts 85 and 86 to the contacts 89 and 91, respectively, which reverses the flow of current from the brushes 83 and 84 through the battery 95.

In reconditioning a lead-acid storage battery, the battery is connected to the output terminal of a charger embodying the principles of my invention, and the current is allowed to flow through the battery in the normal manner for recharging. At predetermined intervals the current is caused to be reversed through the battery either by closing a switch such as 51 or opening the switch 99. The current is allowed to flow in the reverse direction a relatively short period of time, and it is believed that this reversal of flow of current dispels gaseous molecules collecting on the plate, thereby dispersing them into the electrolyte again to form useful ions.

Further modified form

Figure 3:
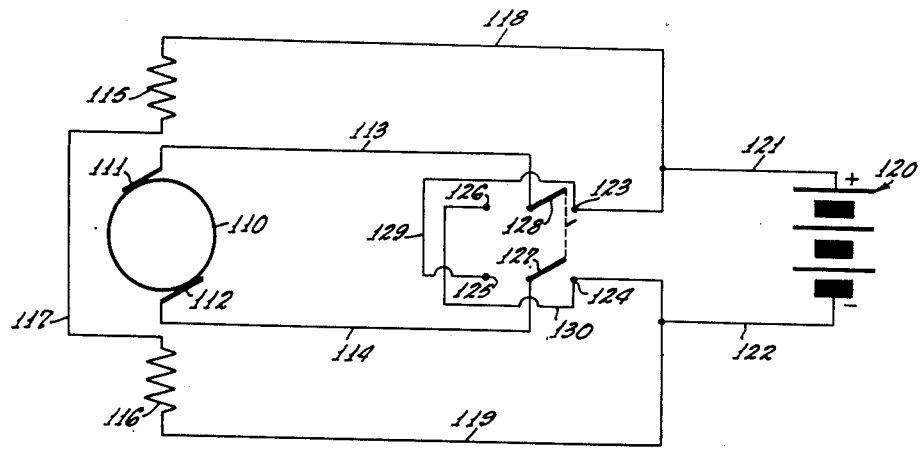
Figure 3 is a schematic diagram of a further modification of my invention.

In Figure 3, I have illustrated a further simplified electrical system embodying this invention for accomplishing the method of treating battery cells. The circuit comprises a generator having an armature 110 and collector brushes 111 and 112. The brushes 111 and 112 are connected to a double pole, double throw reversing switch by conductors 113 and 114 respectively. The generator is also provided with field coils 115 and 116 connected by conductor 117. The field coils 115 and 116 are connected to the return terminals of the double pole reversing switch by conductors 118 and 119 respectively. A battery 120 to be charged is connected to the same terminals of the double throw reversing switch as the field coils by conductors 121 and 122.

The double pole, double throw switch is provided with terminals 123, 124, 125 and 126 and a pair of switch blades 127 and 128.

The switch blade 127 is adapted to contact the points 124 and 125, and the switch blade 128 is adapted to contact the points 123 and 126. Terminal points 123 and 125 are interconnected by conductor 129, and terminal points 124 and 126 are interconnected by conductor 130.

Thus it will be seen that by reversing the position of the switch blades 127—128 the output from the generator can be reversed at will to the battery 120.

Although the invention has been herein shown and described in what is conceived to be the most practical and preferred method and embodiment, it is recognized that departures may be made therefrom within the scope of the invention, which is not to be limited to the details disclosed herein but is to be accorded the full scope of the claims so as to embrace any and all equivalent structures and methods.

The invention having been herein described, what I claim as new and desire to secure by Letters Patent is:

1. A process for reionizing storage batteries comprising connecting the brush terminals of a shunt field type generator through a pole reversing switch respectively to positive and negative storage battery terminals, impressing electric energy of the generator upon the battery at a charging voltage sufficiently in excess of the rated battery voltage to overcome internal resistance and at substantially the current value of said battery for a predetermined time interval, periodically breaking the initial brush connections to the battery through said switch and subsequently while the generator continues to operate, remaking the connections in reverse polarity after a voltage surge has built up in the generator, whereby an instantaneous higher voltage in a reverse direction is impressed on the battery terminals, continuing the initial voltage reversely impressed on the battery terminals for a brief interval relatively shorter than said predetermined time interval, and then repeating the initial charge and subsequent reversal a number of times until the internal battery resistance decreases to a value wherein substantially the rated battery voltage prevails.

2. A process for reionizing an individual used storage battery comprising connecting the brush terminals of a shunt field type generator through a pole reversing switch respectively to the positive and negative terminals of the storage battery, connecting the terminals of the shunt field circuit of the generator directly to the storage battery, impressing electric energy of the generator upon the battery at a charging voltage sufficiently in excess of the rated battery voltage to overcome internal resistance and at substantially the current value of said battery for a predetermined time interval, periodically breaking the initial brush connections to the battery through said switch and subsequently while the generator continues to operate remaking the connections in reverse polarity after a voltage surge has built up in the generator, whereby an instantaneous higher voltage in a reverse direction is impressed on the battery terminals, continuing the initial voltage reversely impressed on the battery terminals for a brief interval relatively shorter than said predetermined time interval, and then repeating the initial charge and subsequent reversal a number of times until the internal battery resistance decreases to a value wherein substantially the rated battery voltage prevails.

ROBERT L. BRIGGS, JR.

REFERENCES CITED

The following references are of record in the file of this patent:

UNITED STATES PATENTS

| Number | Name | Date |
| --- | --- | --- |
| 264,952 | Maxim | Sept. 26, 1882 |
| 516,498 | Lewis | Mar. 13, 1894 |
| 949,507 | Tate | Feb. 15, 1910 |
| 1,126,667 | Wilson | Jan. 26, 1915 |
| 1,126,670 | Wilson | Jan. 26, 1915 |
| 1,362,844 | Cardoza | Dec. 21, 1920 |
| 2,342,929 | Fletcher | Feb. 26, 1944 |
| 2,503,179 | Tichenor | Apr. 4, 1950 |